No. 616,481. Patented Dec. 27, 1898.
R. MIEHLE.
VELOCIPEDE.
(Application filed Nov. 8, 1895.)
(No Model.) 2 Sheets—Sheet 1.
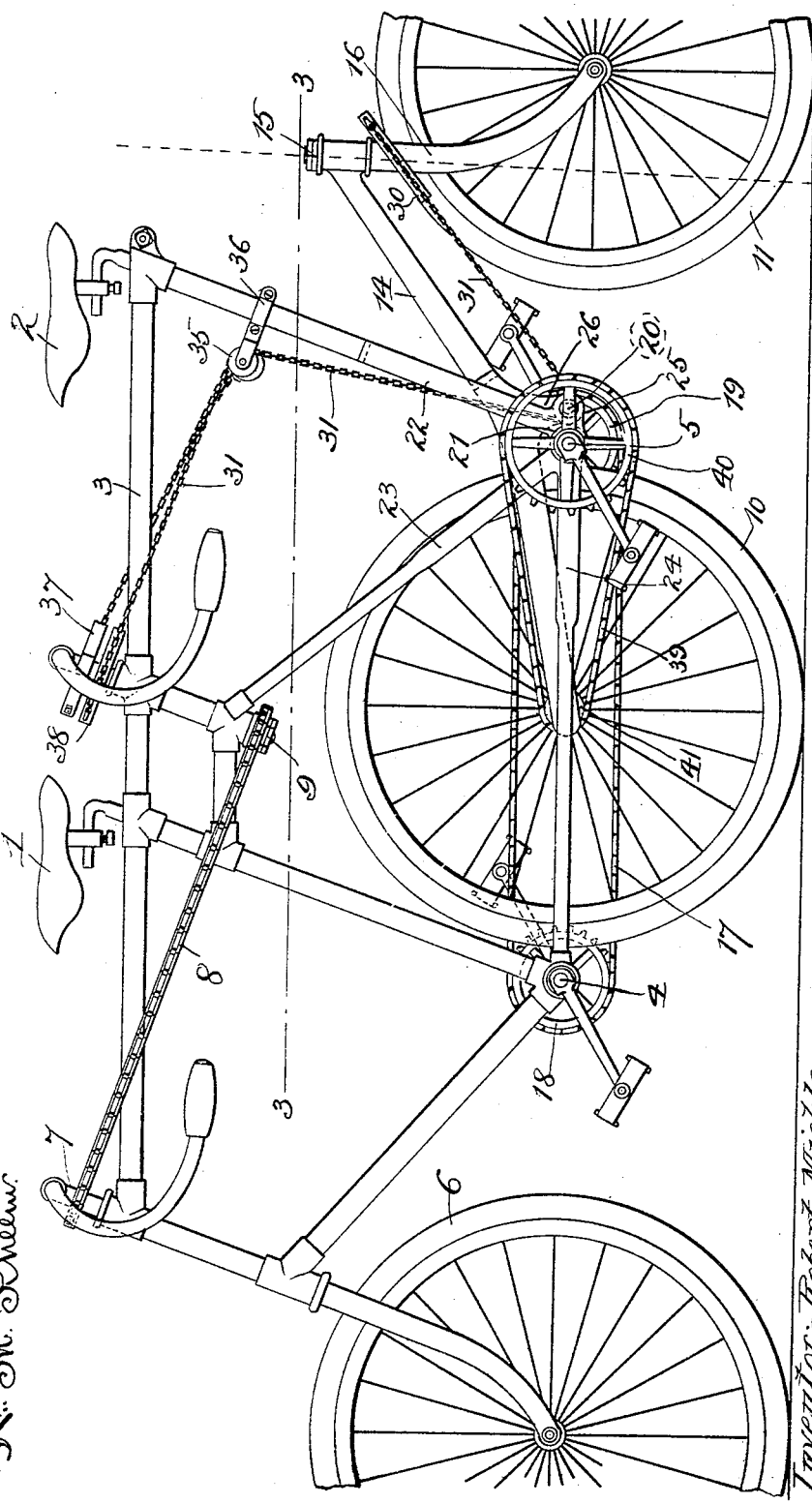

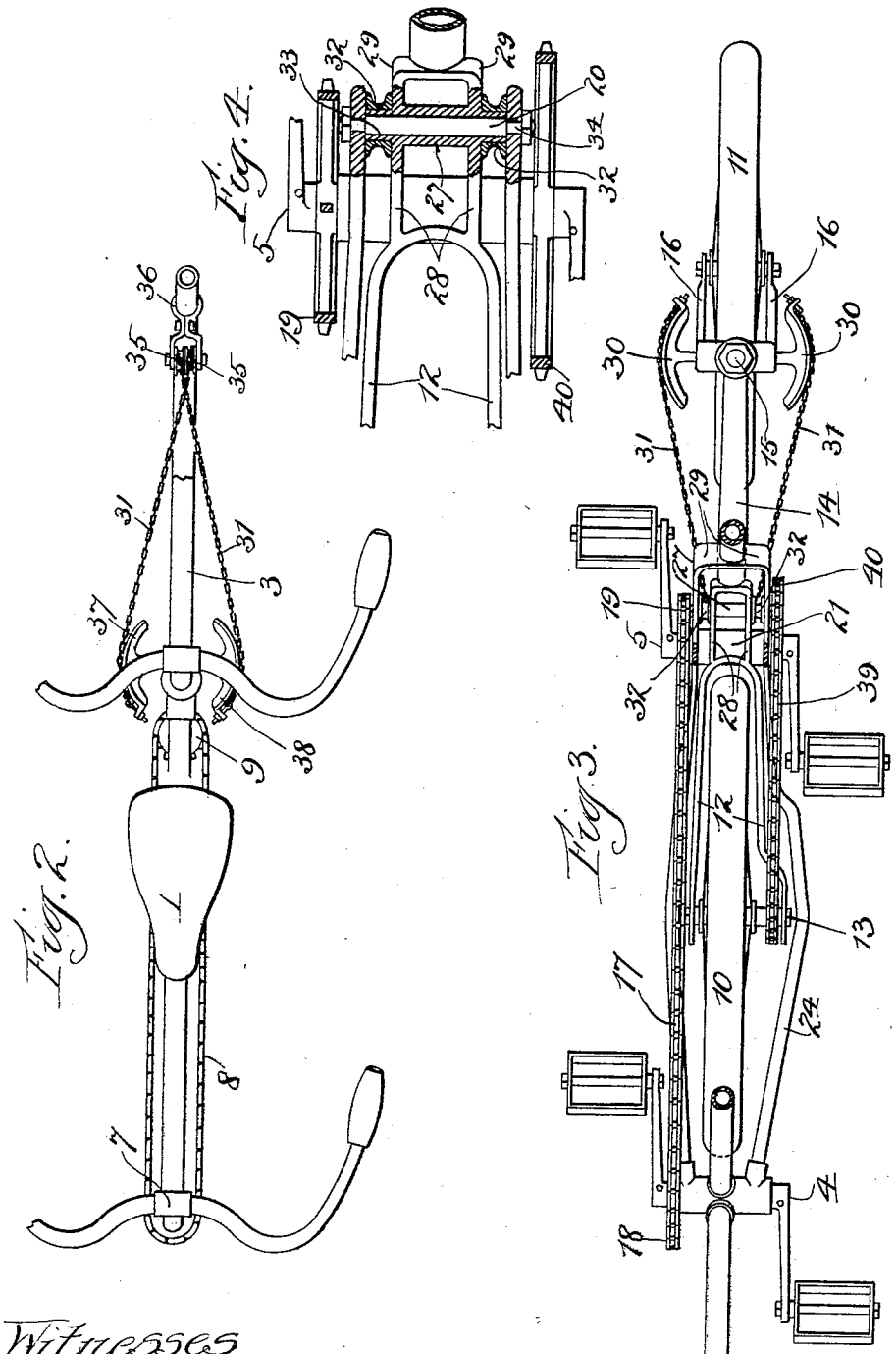

UNITED STATES PATENT OFFICE.

ROBERT MIEHLE, OF CHICAGO, ILLINOIS.

VELOCIPEDE.

SPECIFICATION forming part of Letters Patent No. 616,481, dated December 27, 1898.

Application filed November 8, 1895. Serial No. 568,334. (No model.)

*To all whom it may concern:*

Be it known that I, ROBERT MIEHLE, a citizen of the United States, residing at Chicago, in the county of Cook and State of Illinois, have invented certain new and useful Improvements in Velocipedes, of which the following is a full, clear, and exact specification.

An objectionable feature of the ordinary velocipede experienced in riding it is the jar which the rider receives when passing over obstructions or irregularities in the road. With the popular form of velocipede commonly known as the "safety" this jar is not felt perceptibly or disagreeably until the rear wheel reaches the obstruction, because the rider is supported substantially over that wheel, and consequently to pass the obstruction requires a direct lift of the rider the full height of the obstruction, whereas the forward wheel in passing over the obstruction lifts the rider but a small fraction of the distance, and therefore the effect of an obstruction on the front wheel is less disagreeable to the rider and less destructive to the momentum of the machine than it is on the rear one. It is of course very evident that the described objection might be avoided by carrying the rear wheel farther to the rear of the saddle or by carrying the saddle farther forward; but both of these expedients would give rise to other and probably more fatal objections, for, on the one hand, the length of the machine would be greatly increased and, on the other hand, it would simply amount to dividing the jar between the two wheels. The jar from the forward wheel would be felt much more severely and the rider would be too close to the handle-bar and in an awkward position with reference to the driving or crank shaft.

The improvements are shown as applied to a tandem; but it will nevertheless be understood that they are equally applicable to a single-seat machine.

The primary object of my present invention is to decrease the jar or movement given the rider by the rear wheel passing over an obstruction or irregularity, but without moving the rider's point of support nearer to the front wheel, and at the same time to provide means for automatically causing the rear one of the ground-wheels to turn in unison with the steering-wheel, whereby such rear wheel may be positively steered in the proper direction when the machine is turned around.

Another object of my invention is to simplify the gearing mechanism between the crank-shaft and the driving-wheel, whereby such driving-wheel may be geared directly to the crank-shaft; and a still further object of my invention is to increase the traction of the driving-wheel.

With these ends in view my invention consists in certain features of novelty by which the said objects and certain other objects hereinafter appearing are attained, all as fully explained with reference to the accompanying drawings and more particularly pointed out in the claims.

In the said drawings, Figure 1 is a side elevation of a tandem embodying my improvements. Fig. 2 is a plan view of a part thereof. Fig. 3 is a partial plan view in section, taken on the line 3 3, Fig. 1; and Fig. 4 is an enlarged detail plan section taken through the rear pivotal support of the main frame.

In carrying out my invention I preferably employ a velocipede-frame of the ordinary form and construction or that which is usually used on the type of velocipede commonly known as the "safety." In the particular example shown in the drawings the frame is constructed for a tandem and is provided with one or more saddles 1 2, secured to the upper horizontal bar 3, and also with the usual crank-shafts 4 5, journaled in the lower part of the frame 6, being the steering-wheel whose steering stem or head 7 is connected by chain-gearing 8 with the steering-stem 9 for the rear rider on the seat 2.

Following out the principle of a lever of the second order—that the weight moves a less distance than the power end of the lever—I provide the rear end of the frame of the velocipede with a lever-support, and I provide each end of this lever with an independent ground-wheel, so that in riding over an obstruction, the upward movement of the wheel being considered the power, the frame, if supported upon the lever midway between its ends, will receive an upward movement which is equal to but half the upward movement of the wheel mounting the obstruction, and thus the lever being of considerable length, as it may be, the jar occasioned the rider is materially reduced. In carrying out this principle I employ two rear wheels 10 11, which are mounted, respectively, in the ends of a frame which constitutes the lever heretofore referred to, upon which the main frame of the machine is supported at its rear end and between the two ground-wheels 10 11. This said frame, in which the wheels 10 11 are mounted, preferably consists of two forks or lateral members 12 at its forward end, whose extremities are provided with suitable openings (not shown) for the reception of the axle 13 of the forward ground-wheel 10, which is secured in place in the said openings in the fork 12 by nuts or other suitable devices in the ordinary manner. The rear end of this frame preferably consists of an arm or bar 14, which extends upwardly and is pivotally secured to the stem 15 of the forks 16, in which the rear ground-wheel 11 is journaled, whereby such rear wheel is swiveled in the frame 12 14, and is free to turn on the vertical axis of the stem 15, so that in making abrupt turns with the velocipede the rear wheel 11 will be capable of sufficient deflection from the straight course to permit it to swing around the forward wheel 10 without dragging sidewise.

The forward crank-shaft 4 is geared to the rear crank-arm 5 by means of the chain 17, as usual, passing around the sprocket 18 on the forward crank-shaft and the sprocket 19 on the rear crank-shaft 5. In order that the crank-shaft 5 may be geared directly to the axle of the driving-wheel 10 and in such a manner that the rising and falling of the wheel 10 in passing over obstructions or through depressions will not materially lengthen and shorten the distance between the center of the wheel 10 and the pivotal point of connection between the main frame of the machine and the lever-frame 12 14, I locate the pivot pintle or bolt 20, which supports the main frame of the machine, upon the lever-frame 12 14 at a point directly in the rear and in close proximity to the crank-hanger or journal-bearing 21 of the rear crank-shaft 5. This may be conveniently accomplished by providing the converging members 22, 23, and 24 of the main frame where they come together with a boss 25 on each side of the machine and through which bosses the pintle 20 passes, the lever-frame 14 being provided on each side with a downwardly-projecting ear 26, which ears are connected together or formed integrally with a hub or sleeve 27, through which the pintle 20 passes, as shown more clearly in Fig. 4. The purpose of these downwardly-projecting ears 26 is to enable the forks 12 being passed forward over the crank-hanger or journal-bearing 21 without striking the latter as the levers 12 14 oscillate on their pivot 20. As shown in Fig. 4, the forks 12 are U-shaped at their rear ends and have rearward extensions 28, secured to or formed integrally with the ears 26, and the arm or bar 14 is likewise provided at its rear end with two projections 29, which are also secured to or formed integrally with the ears 26.

Secured in any suitable manner to the rear fork 16 and on each side thereof is a sector or segment 30, to each of which is attached a chain 31, which pass around the pivot 20 of the lever-frame 12 14 and are connected in any suitable way with the steering-wheel. This arrangement and connection may best be effected by inclining the sectors or segments 30, as shown in Fig. 1, so as to be in line with the chains 31 and locating concentric with the pivot 20 and on each side of the frame a roller or pulley 32, under which the chains 31 pass, respectively. These rollers or pulleys 32 are preferably grooved, as shown in Fig. 4, to prevent the chain from rubbing against the other members of the frame, and they are journaled on projections 33, extending from the sides or ends of the sleeve 27, as shown more clearly in Fig. 4, such projections 33 being also pierced by the pintle 20 and being of sufficient extent to project through or flush with the outer sides of the rollers 32, so that the main frame of the machine 22 23 24, which is also pierced by the reduced shoulders 34 on the pintle 20, will be held from excessive pressure against the pulleys 32. From the rollers 32 the chains 31 pass upward over pulleys 35, secured by any suitable bracket or support 36 to the member 22 of the main frame, such pulleys 35 being arranged in close proximity, as shown in Fig. 2, so as to bring the chains as close together as possible. From here the chains pass to sectors or segments 37 38, secured to the rear steering-stem 9. The chains 31, however, are crossed before passing the pulleys 35, so that when the steering-stem 9 or 7 is turned to the right for imparting a like turn to the steering-wheel 6 the rear swiveled wheel 11 will be turning in the opposite direction or to the left, and thus accomplish the turning of the machine without causing any of the wheels to drag or slide sidewise, as will be understood. In order that the chains 31 may be passed over each other in this manner, the sectors 37 38 are arranged at different elevations, as shown in Fig. 1.

The purpose of passing the chains 31 around the pivot 20 of the lever-frame 12 14 instead of passing them directly back to the steering-stem of the rear wheel 11, it will be seen, is to avoid any alteration of the position of the wheel 11 that might be caused by the oscillation of the lever-frame 12 14 in passing over obstructions or through depressions.

The important advantage of pivoting the lever-frame 12 14 eccentrically with the crank-shaft 5 is that it does not increase the width of the tread, whereas if the pivot of the lever-frame were concentric with the shaft 5 the tread of the wheel would be thereby increased not only by the combined thickness of the two sides of the frame 22 23 24, but by the combined thickness of the rollers or pulleys 32, which are of necessity located on the same center as the lever-frame 12 14. This eccentric relation of the pivot 20 of the lever-frame 12 14 does not, however, materially affect the tension of the chain 39, which connects the sprocket-wheel 40 on the crank-shaft 5 with the sprocket 41 on the driving-wheel 10, because the two centers 5 and 20 are located so close together that the difference between the arcs described by the chain when taut and the forward end or forks 12 of the lever-frame is scarcely perceptible during the slight movement or oscillation which the forks 12 make.

In order that the greater part of the weight may be borne by the driving-wheel 10, so that the traction of this wheel will be increased, the pivot 20 of the lever-frame 12 14 is located nearer the center of the wheel 10 than the center of the wheel 11, so that a differential leverage will be produced and the greater pressure will be thrown upon the wheel 10, which is secured to the shorter arm of the lever.

With a velocipede constructed according to my invention it will thus be seen that in riding over obstructions or irregularities in the road the effect of the obstruction upon the rider when the steering-wheel encounters it will be just the same as heretofore—that is to say, the main frame of the machine will act as a lever to raise the rider, taking its fulcrum on the pivot 20, and as the rear rider is supported almost directly over such fulcrum or pivot 20 the upward movement induced by the upward movement of the steering-wheel will be very slight, and, conversely, his weight upon the steering-wheel being reduced by the leverage the obstruction will offer but slight resistance to the momentum of the machine. The same principle will apply when the wheel 10 reaches the obstruction. This wheel in raising the full height of the obstruction will lift the rear saddle a trifle more than half the height that the wheel 10 rises, inasmuch as the main frame is supported upon the lever-frame 12 14 at a point almost intermediate of or half-way between the centers of the two wheels 10 11, and it is evident that the front saddle 1 will rise even a less distance, inasmuch as it is farther forward. It is also evident that the obstruction will offer but about half the resistance to the movement of the wheel 10 that it would offer if the entire weight were supported by the wheel 10 alone, as heretofore, the weight in my invention being substantially divided between the two wheels 10 11. Again, when the rear wheel 11 reaches the obstruction the same operation takes place, the axle of the wheel 10 in that case serving as a fulcrum for the lever-frame 12 14; but it is also evident that the rear wheel 11 will impart a less movement vertically to the saddle than is imparted to the saddle by the wheel 10, inasmuch as the rear wheel 11 is attached to the longer arm of the lever-frame 12 14.

It will be understood that in order to prevent the rear trailing wheel 11 from having a tendency to waver as the machine is propelled along the stem of the rear fork 16 should be journaled on a vertical axis; but inasmuch as the rear wheel 11 is often raised above the level of the wheel 10 in passing over obstructions the stem of the fork 16 would be inclined from its upper end rearwardly during the time of such elevation. Hence in order that such stem may be substantially vertical at such periods it is inclined when in its normal position from its upper end forwardly—that is to say, the upper end of the stem is farther to the rear than the lower end. Of course this has reference to the portion of the stem only which is journaled in the arm 14. Thus while the parts are in their normal position, as shown in Fig. 1, the axis of the stem 15 will be inclined from its upper end forwardly; but this forward inclination of the axis does not result in a wavering movement of the wheel, as will be understood from the fact that the arrangement is substantially the same as the arrangement of the steering-stem for the forward steering-wheel 6.

It is quite evident that while I have described my improvements with reference to a tandem or a two-seat velocipede the same are equally applicable to a single-seat machine, and the only difference between the construction shown and described and that which will be necessary in a single-seat machine consists in extending the steering-stem 8 directly to the pulleys 32 and thence to the sectors 30, the steering-stem 9 and attached mechanism in that instance being unnecessary.

Having thus described my invention, what I claim as new therein, and desire to secure by Letters Patent, is—

1. In a velocipede, the combination with a frame, a steering-stem and a steering-wheel, of ground-wheels arranged one before the other and having said frame pivotally supported at one end between them, one of said ground-wheels being deflectable, and a steering connection between said steering-wheel and said deflectable wheel, said steering connection passing around said pivot, substantially as set forth.

2. In a velocipede, the combination with a frame and a steering-wheel, of ground-wheels arranged one before the other and having said frame pivotally supported at one end between them, one of said ground-wheels being swiveled, and a chain or cable secured to said swiveled wheel and passing around the center or pivot supporting said frame, and being attached to or connected with said steering-wheel, substantially as set forth.

3. In a velocipede, the combination with a frame and a steering-wheel, of ground-wheels arranged one before the other and having said frame pivotally supported at one end between them, the rear one of said ground-wheels being swiveled, and a steering connection passing from and being connected with said swiveled wheel to the pivotal support of said frame and having connection with the said steering-wheel, substantially as set forth.

4. In a velocipede, the combination with a frame and a steering-wheel, of a pair of ground-wheels arranged one before the other and having said frame pivotally supported at one end between them, a driving-shaft located between said ground-wheels and being geared to the forward one thereof, the rear one of said ground-wheels being swiveled, and a steering connection between said swiveled wheel and said steering-wheel, said steering connection being passed to the center of said pivotal support for said frame, substantially as set forth.

5. In a velocipede, the combination with a steering-wheel and a frame, of a pair of ground-wheels having said frame pivotally supported at one end between them, the follower of said ground-wheels being swiveled on an axis which is normally inclined from its upper end forwardly, and driving mechanism connected with the other of said ground-wheels, substantially as set forth.

6. In a velocipede, the combination with a steering-wheel and a frame, of a lever-frame pivoted to the rear end of said frame at a point to one side of the mid-length of said lever-frame, a ground-wheel mounted in each end of said lever-frame, and means for driving one of said ground-wheels, substantially as set forth.

7. In a velocipede, the combination with a frame and a steering-wheel, of a lever-frame having projecting ears 26 pivoted to said first frame, a ground-wheel mounted in each end of said lever-frame, a driving-shaft arranged between said ground-wheels and being eccentric to the pivot of said lever-frame, and one of said ground-wheels being geared to said crank-shaft, the other of said ground-wheels being swiveled, pulleys mounted concentrically with the pivot of said lever-frame, sectors secured to said swiveled wheel, a chain secured to each of said sectors and passing under said pulleys, and means for connecting said chains with the steering-wheel, substantially as set forth.

ROBERT MIEHLE.

Witnesses:
JNO. G. ELLIOTT,
EDNA B. JOHNSON.